US011935455B2

(12) United States Patent
Nakamura et al.

(10) Patent No.: US 11,935,455 B2
(45) Date of Patent: Mar. 19, 2024

(54) IMAGE DISPLAY SYSTEM, IMAGE DISPLAY DEVICE, IMAGE DISPLAY METHOD, AND COMPUTER PROGRAM

(71) Applicant: EIZO Corporation, Hakusan (JP)

(72) Inventors: Tatsuya Nakamura, Hakusan (JP); Airi Kurokawa, Hakusan (JP); Masahiro Sugumi, Hakusan (JP)

(73) Assignee: EIZO Corporation, Hakusan (JP)

( * ) Notice: Subject to any disclaimer, the term of this patent is extended or adjusted under 35 U.S.C. 154(b) by 0 days.

(21) Appl. No.: 18/255,199

(22) PCT Filed: Feb. 2, 2021

(86) PCT No.: PCT/JP2021/003769
§ 371 (c)(1),
(2) Date: May 31, 2023

(87) PCT Pub. No.: WO2022/168171
PCT Pub. Date: Aug. 11, 2022

(65) Prior Publication Data

US 2024/0029616 A1 Jan. 25, 2024

(51) Int. Cl.
*G09G 3/20* (2006.01)

(52) U.S. Cl.
CPC ... *G09G 3/2007* (2013.01); *G09G 2320/0626* (2013.01); *G09G 2320/066* (2013.01); *G09G 2360/145* (2013.01); *G09G 2360/16* (2013.01)

(58) Field of Classification Search
CPC ..... G09G 2320/0626; G09G 2320/045; G09G 2320/066; G09G 2360/145;
(Continued)

(56) References Cited

U.S. PATENT DOCUMENTS

2001/0033260 A1* 10/2001 Nishitani ................ H04N 9/69 348/E9.054
2005/0248508 A1* 11/2005 Seong ................ G09G 3/2044 345/63
(Continued)

FOREIGN PATENT DOCUMENTS

CN 106157904 A 11/2016
JP 2004159986 A 6/2004
(Continued)

OTHER PUBLICATIONS

International Search Report dated Apr. 20, 2021, in corresponding International Application No. PCT/JP2021/003769; 4 pages.

*Primary Examiner* — Amy Onyekaba
(74) *Attorney, Agent, or Firm* — Maier & Maier, PLLC

(57) ABSTRACT

An object of the present invention is to provide the image display system, the image display device, the image display method and the computer program that can enhance usability when changing a luminance setting value.
The image processing unit is configured to set a gradation characteristic of the image data to be displayed on the image display unit to a first gradation characteristic and simultaneously switch a luminance setting value from a first luminance setting value to a second luminance setting value when the image display system accepts a request to change the luminance setting value of the image display unit from the first luminance setting value to the second luminance setting value, and then switch the gradation characteristic of the image data to be displayed on the image display unit to a second gradation characteristic.

10 Claims, 9 Drawing Sheets

(58) Field of Classification Search
CPC ........... G09G 2360/16; G09G 2320/02; G09G 2320/0271; G09G 2340/0428; G09G 3/2803; G09G 2320/0242; G09G 2320/0276; G09G 2320/0238; G09G 2320/0233
See application file for complete search history.

(56) References Cited

U.S. PATENT DOCUMENTS

| | | | | |
|---|---|---|---|---|
| 2007/0152949 | A1* | 7/2007 | Sakai | G09G 3/3607 345/102 |
| 2007/0222743 | A1* | 9/2007 | Hirakata | G09G 3/3651 345/102 |
| 2008/0211801 | A1* | 9/2008 | Shiomi | G09G 3/3607 345/214 |
| 2010/0118006 | A1* | 5/2010 | Kimura | G09G 3/3611 348/673 |
| 2010/0238356 | A1* | 9/2010 | Kida | G09G 5/10 348/618 |
| 2011/0175552 | A1* | 7/2011 | Kwon | H05B 45/10 315/307 |
| 2012/0057084 | A1* | 3/2012 | Sano | G09G 3/3611 348/790 |
| 2012/0320105 | A1* | 12/2012 | Ueno | G09G 3/3426 345/102 |
| 2013/0093803 | A1* | 4/2013 | Saitoh | G09G 3/2025 345/102 |
| 2013/0169607 | A1* | 7/2013 | Inukai | G09G 5/14 345/207 |
| 2014/0225943 | A1* | 8/2014 | Shiobara | G09G 3/3607 345/694 |
| 2016/0054969 | A1* | 2/2016 | Maruyama | G06F 3/1446 345/690 |
| 2017/0221405 | A1* | 8/2017 | Yoshida | G09G 3/2007 |
| 2018/0033400 | A1* | 2/2018 | Nagashima | G06T 5/007 |
| 2018/0322847 | A1* | 11/2018 | Aoki | G09G 5/10 |
| 2019/0066606 | A1* | 2/2019 | Sato | G09G 3/2003 |
| 2019/0265552 | A1* | 8/2019 | Shiomi | G02F 1/133609 |
| 2019/0289217 | A1* | 9/2019 | Nakagawa | H04N 23/64 |

FOREIGN PATENT DOCUMENTS

| | | | |
|---|---|---|---|
| JP | 2016042954 | A | 4/2016 |
| JP | WO2020235109 | A1 * | 11/2020 |
| WO | 2005050614 | A1 | 6/2005 |
| WO | 2009104584 | A1 | 8/2009 |
| WO | 2014162555 | A1 | 10/2014 |

* cited by examiner

SECOND GRADATION CHARACTERISTIC :
ACQUISITION FLOW OF SECOND TARGET LUMINANCE

FIG. 6A (FORMULA 1) FORMULA FOR CONVERTING LUMINANCE TO JND VALUE $$j(L) = A + B \cdot Log_{10}(L) + C \cdot (Log_{10}(L))^2 + D \cdot (Log_{10}(L))^3 + E \cdot (Log_{10}(L))^4 + F \cdot (Log_{10}(L))^5 + G \cdot (Log_{10}(L))^6 + H \cdot (Log_{10}(L))^7 + I \cdot (Log_{10}(L))^8$$

| | | |
|---|---|---|
| A = 71.498068 | B = 94.593053 | C = 41.912053 |
| D = 9.8247004 | E = 0.28175407 | F = -1.1878455 |
| G = -0.18014349 | H = 0.14710899 | I = - 0.017046845 |

FIG. 6B (FORMULA 2) FORMULA FOR CONVERTING JND VALUE TO LUMINANCE $$\log_{10} L(j) = \frac{a + c \cdot Ln(j) + e \cdot (Ln(j))^2 + g \cdot (Ln(j))^3 + m \cdot (Ln(j))^4}{1 + b \cdot Ln(j) + d \cdot (Ln(j))^2 + f \cdot (Ln(j))^3 + h \cdot (Ln(j))^4 + k \cdot (Ln(j))^5}$$

| | | |
|---|---|---|
| a = -1.3011877 | b = -2.5840191E-2 | c = 8.0242636E-2 |
| d = -1.0320229E-1 | e = 1.3646699E-1 | f = 2.8745620E-2 |
| g = -2.5468404E-2 | h = -3.1978977E-3 | k = 1.2992634E-4 |
| m = 1.3635334E-3 | | |

FIG. 6C (FORMULA 3) FORMULA FOR CALCULATING TARGET JND VALUE Jm FOR EACH GRADATION $$J_m = (J_{max} - J_{min}) \times (255/m) + J_{min}$$

$J_{max}$: MAXIMUM JND VALUE
$J_{min}$: MINIMUM JND VALUE

FIG. 7

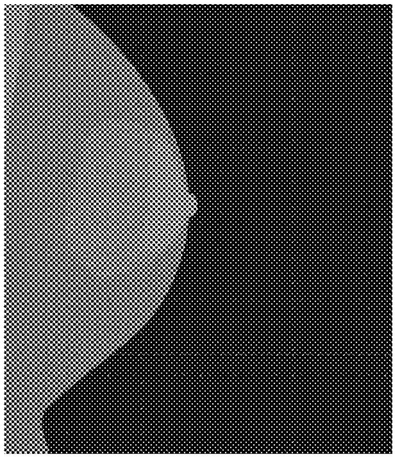

D1

LUMINANCE INCREASE MODE OFF

BEFORE CHANGING LUMINANCE SETTING VALUE

DISPLAYING IMAGE BASED ON GSDF

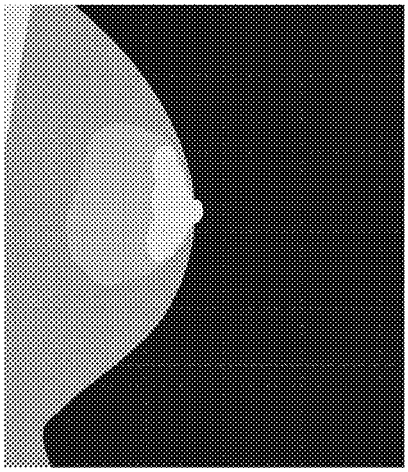

D2

LUMINANCE INCREASE MODE ON

AFTER CHANGING LUMINANCE SETTING VALUE

DISPLAYING IMAGE BASED ON FIRST GRADATION CHARACTERISTIC IN GSDF

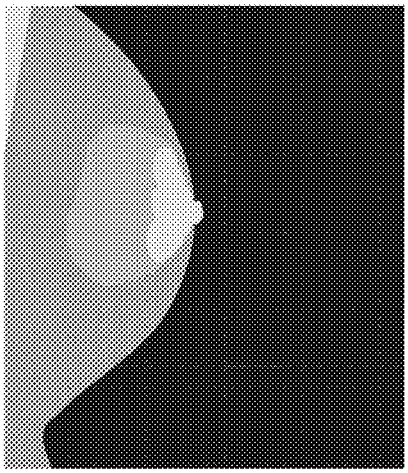

D3

LUMINANCE INCREASE MODE ON

AFTER CHANGING LUMINANCE SETTING VALUE

DISPLAYING IMAGE BASED ON SECOND GRADATION CHARACTERISTIC IN GSDF

IMAGE WITH LUMINANCE INCREASE MODE OFF

IMAGE WITH LUMINANCE INCREASE MODE ON

IMAGE DISPLAY SYSTEM 100

IMAGE DISPLAY SYSTEM, IMAGE DISPLAY DEVICE, IMAGE DISPLAY METHOD, AND COMPUTER PROGRAM

TECHNICAL FIELD

The present invention relates to an image display system, an image display device, an image display method, and a computer program.

BACKGROUND ART

In some cases, an image displayed on an image display unit is preferably displayed with a desired gradation characteristic. For example, a mammography image, which is one type of medical images, is preferably displayed with a gradation characteristic called GSDF (Grayscale Standard Display Function) of DICOM (Digital Imaging and Communication in Medicine) standard from a viewpoint of interpretation. Accordingly, an image display system configured to change a gradation characteristic of an image displayed on an image display unit according to a type of image displayed on the image display unit (see patent literature 1, for example).

CITATION LIST

Patent Literature

[Patent Literature 1] JP-A-2016-42954

SUMMARY OF INVENTION

Technical Problem

Normally, the image display unit can change a luminance for the purpose of improving the visibility of a displayed image, for example. Here, when a luminance setting value is changed, an image display system causes an image display unit to display an image with a changed luminance setting value. At this time, it is necessary to acquire a target luminance of each gradation value corresponding to a desired gradation characteristic described above. In order to acquire a target luminance corresponding to a desired gradation characteristic, a control device of the image display system needs a display luminance based on a changed luminance setting value and a predetermined calculation. Further, it is desirable that a display luminance is an actually measured value in order to realize more accurate gradation characteristic. Conventionally, in changing a luminance setting value, when a request to change the luminance setting value is accepted, the following operations (1) to (4) are required.

(1) A luminance setting value is changed.

(2) After the luminance setting value is changed, a display luminance is measured.

(3) A target luminance for each gradation value is acquired based on the measured display luminance (4) A gradation value is switched.

Therefore, there is a time lag between when a user changes a luminance of an image display unit and when an image corresponding to a desired gradation characteristic is displayed on the image display unit. During this time lag period, a usability of an image display system may be impaired because a gradation characteristic of a displayed image deviates from a desired gradation characteristic by displaying an image based on a gradation characteristic before changing a luminance with the display luminance after changing the luminance.

The present invention has been made in view of such a circumstance. An object of the present invention is to provide the image display system, the image display device, the image display method, and the computer program that can enhance usability when changing a luminance setting value.

Solution to Problem

The present invention provides an image display system configured to display image data comprising: an image display unit; a luminance acquisition unit; and an image processing unit, wherein the image display unit is configured to display the image data, the luminance acquisition unit is configured to be able to acquire a display luminance of the image display unit, the image processing unit is configured to set a gradation characteristic of the image data to be displayed on the image display unit to a first gradation characteristic and simultaneously switch a luminance setting value from a first luminance setting value to a second luminance setting value when the image display system accepts a request to change the luminance setting value of the image display unit from the first luminance setting value to the second luminance setting value, and then switch the gradation characteristic of the image data to be displayed on the image display unit to a second gradation characteristic, the first gradation characteristic associates a gradation value with a first target luminance, the first target luminance is acquired based on the display luminance in a state of displaying the image data at the first luminance setting value before the image display system accepts the request, and the first target luminance is a target luminance estimated to display the image data at the display luminance in a state where the image display unit sets the second luminance setting value as the luminance setting value, the second gradation characteristic associates the gradation value with a second target luminance, and the second target luminance is acquired based on the display luminance in a state of displaying the image data of the first gradation characteristic with the second luminance setting value.

In the present invention, a gradation characteristic of image data to be displayed on an image display unit is set to a first gradation characteristic, and simultaneously a luminance setting value is switched from a first luminance setting value to a second luminance setting value when a request to change the luminance setting value from the first luminance setting value to the second luminance setting value is accepted, and then the gradation characteristic of the image data to be displayed on the image display unit is switched to a second gradation characteristic. The first gradation characteristic associates a target luminance (that is, a first target luminance) estimated using a second luminance setting value with a gradation value. On the other hand, the second gradation characteristic associates a target luminance (that is, a second target luminance) acquired based on a display luminance of a second luminance setting value actually acquired by a luminance acquisition unit with a gradation value. Therefore, the first gradation characteristic and the second gradation characteristic are similar. As a result, after a request is accepted and before image data corresponding to a second gradation characteristic is displayed on an image display unit, it is possible for a user to visually recognize image data corresponding to the first gradation characteristic that is closer to the second gradation characteristic than a gradation characteristic before accepting the request, and thus usability can be enhanced.

Various embodiments of the present invention are described below. Any of the embodiments described below can be combined with one another.

Preferably, the first target luminance is based on the first luminance setting value before the image display system accepts the request and an operating current value of the image display unit corresponding to the first luminance setting value.

Preferably, the first gradation characteristic and the second gradation characteristic are composed of a function or a table.

Preferably, the second luminance setting value is greater than the first luminance setting value.

Preferably, the second luminance setting value is a maximum value that can be set in the image display unit.

Preferably, the image processing unit returns the luminance setting value of the image display unit from the second luminance setting value to the first luminance setting value when a predetermined time passes after the image display system accepts the request.

Preferably, the image processing unit is configured to emphasize a frame of the image data displayed on the image display unit when the image display system accepts the request.

Another aspect of the present invention provides an image display device configured to display image data comprising: an image display unit; a luminance acquisition unit; and an image processing unit, wherein the image display unit is configured to display the image data, the luminance acquisition unit is configured to be able to acquire a display luminance of the image display unit, the image processing unit is configured to set a gradation characteristic of the image data to be displayed on the image display unit to a first gradation characteristic and simultaneously switch a luminance setting value from a first luminance setting value to a second luminance setting value when the image display device accepts a request to change the luminance setting value of the image display unit from the first luminance setting value to the second luminance setting value, and then switch the gradation characteristic of the image data to be displayed on the image display unit to a second gradation characteristic, the first gradation characteristic associates a gradation value with a first target luminance, the first target luminance is acquired based on the display luminance in a state of displaying the image data at the first luminance setting value before the image display device accepts the request, and the first target luminance is a target luminance estimated to display the image data at the display luminance in a state where the image display unit sets the second luminance setting value as the luminance setting value, the second gradation characteristic associates the gradation value with a second target luminance, and the second target luminance is acquired based on the display luminance in a state of displaying the image data of the first gradation characteristic with the second luminance setting value.

Another aspect of the present invention provides an image display method for displaying image data on an image display unit comprising: a luminance acquisition step; and an image processing step, wherein in the luminance acquisition step, a display luminance of the image display unit is acquired, in the image processing step, a gradation characteristic of the image data to be displayed on the image display unit is set to a first gradation characteristic and simultaneously a luminance setting value of the image display unit is switched from a first luminance setting value to a second luminance setting value when a request to change the luminance setting value from the first luminance setting value to the second luminance setting value is accepted, and then the gradation characteristic of the image data to be displayed on the image display unit is switched to a second gradation characteristic, the first gradation characteristic associates a gradation value with a first target luminance, the first target luminance is acquired based on the display luminance in a state of displaying the image data at the first luminance setting value before the request is accepted, and the first target luminance is a target luminance estimated to display the image data at the display luminance in a state where the image display unit sets the second luminance setting value as the luminance setting value, the second gradation characteristic associates the gradation value with a second target luminance, and the second target luminance is acquired based on the display luminance in a state of displaying the image data of the first gradation characteristic with the second luminance setting value.

Another aspect of the present invention provides a computer program causing a computer to execute an image display method described above. That is, the present invention provides a computer program for executing an image display method for displaying image data on an image display unit comprising: a luminance acquisition step; and an image processing step, wherein in the luminance acquisition step, a display luminance of the image display unit is acquired, in the image processing step, a gradation characteristic of the image data to be displayed on the image display unit is set to a first gradation characteristic and simultaneously a luminance setting value of the image display unit is switched from a first luminance setting value to a second luminance setting value when a request to change the luminance setting value from the first luminance setting value to the second luminance setting value is accepted, and then the gradation characteristic of the image data to be displayed on the image display unit is switched to a second gradation characteristic, the first gradation characteristic associates a gradation value with a first target luminance, the first target luminance is acquired based on the display luminance in a state of displaying the image data at the first luminance setting value before the request is accepted, and the first target luminance is a target luminance estimated to display the image data at the display luminance in a state where the image display unit sets the second luminance setting value as the luminance setting value, the second gradation characteristic associates the gradation value with a second target luminance, and the second target luminance is acquired based on the display luminance in a state of displaying the image data of the first gradation characteristic with the second luminance setting value.

BRIEF DESCRIPTION OF DRAWINGS

FIG. 6A shows a contrast sensitivity function derived from a Barten-Model.

FIG. 6B shows a formula derived from the Barten-Model and which calculates a luminance corresponding to the next 1 JND difference from an arbitrary luminance.

FIG. 6C shows a formula used when calculating a target JND value.

FIG. 7 schematically shows an image when a luminance increase mode is OFF, an image when the luminance increase mode is ON, and an image based on the second gradation characteristic when the luminance increase mode is ON.

FIG. 8B schematically shows an image displayed on the image display unit when the luminance increase mode is ON.

DESCRIPTION OF EMBODIMENTS

Now, embodiments of the present invention will be described with reference to the drawings. Various features described in the embodiments below can be combined with each other. In addition, the present invention is established independently for each feature.

1. GRADATION CHARACTERISTIC

Figure 5:
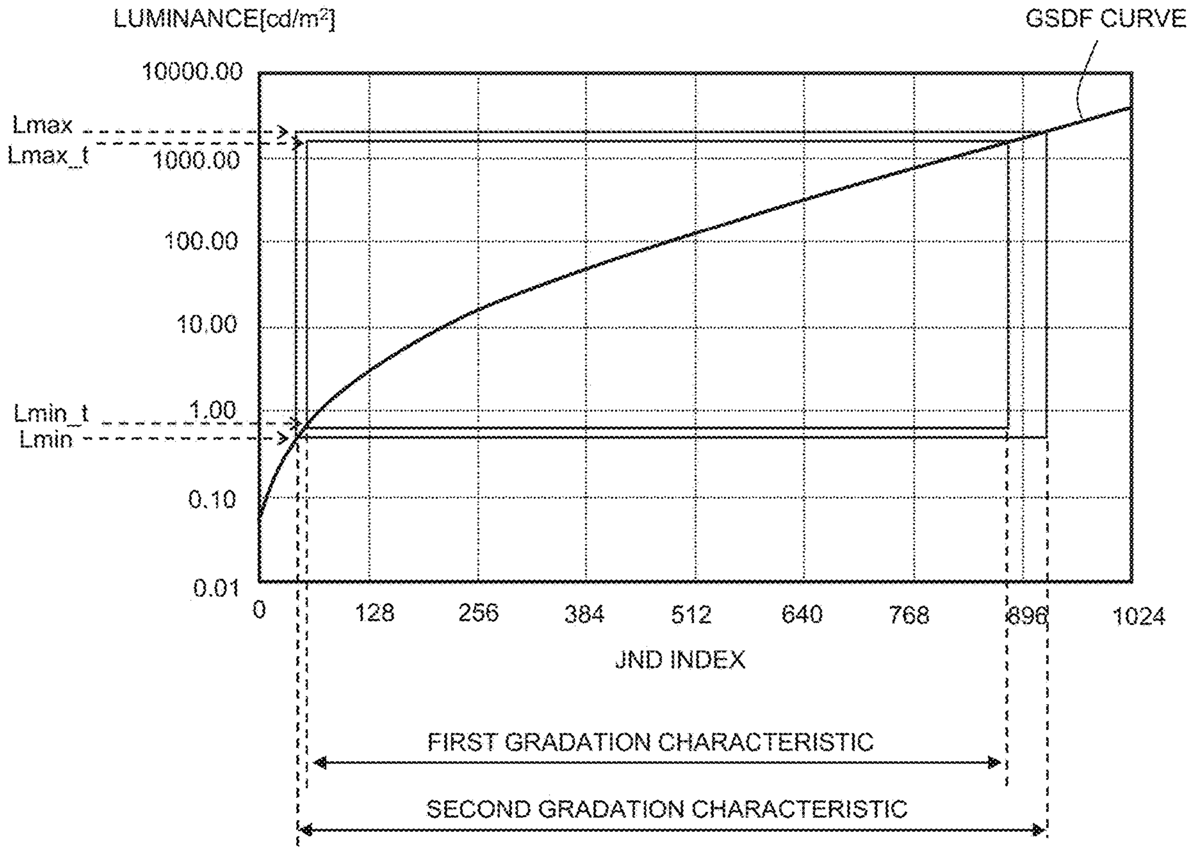
FIG. 5 is a graph for explaining the first and second gradation characteristics in GSDF of DICOM standard.

An image display system 100 is configured to display an image with predetermined gradation characteristics. The image in the embodiment is described as a mammography image, which is a medical image. Further, the predetermined gradation characteristics include first and second gradation characteristics described later. Both the first and second gradation characteristics in the embodiment use gradation characteristics called GSDF (Gray Scale Standard Display Function) of the DICOM standard. Specifically, the GSDF curve shown in FIG. 5 associates a target luminance with a JND index and shows the gradation characteristics of the GSDF as curves. When the first and second gradation characteristics are expressed as curves, the curves are superimposed on the GSDF curve.

It is noted that the DICOM standard is an international standard for medical digital images and ensures consistency in image display so as to enable doctors to accurately read and diagnose images. Although human visual characteristics are non-linear with respect to brightness, the GSDF of the DICOM standard is defined so as to establish visual linearity. Specifically, the GSDF is derived from the Barten-Model, which is based on the human visual characteristics of image display.

In the DICOM, an index called the JND (Just-Noticeable Difference) index is used. In the JND index, 1 JND is defined as the smallest luminance difference for a given target that can be distinguished by an observer of the image, and the JND index is value that is attributed to a luminance difference where one step in the JND index is the discrimination range. Although the embodiment is described as using the JND index based on the Barten-Model, it is not limited to that, and an index corresponding to the smallest luminance difference that can be discriminated by the observer of the image, derived by a method other than the Barten-Model, may be also used.

2. DESCRIPTION OF OVERALL CONFIGURATION

Figure 1:
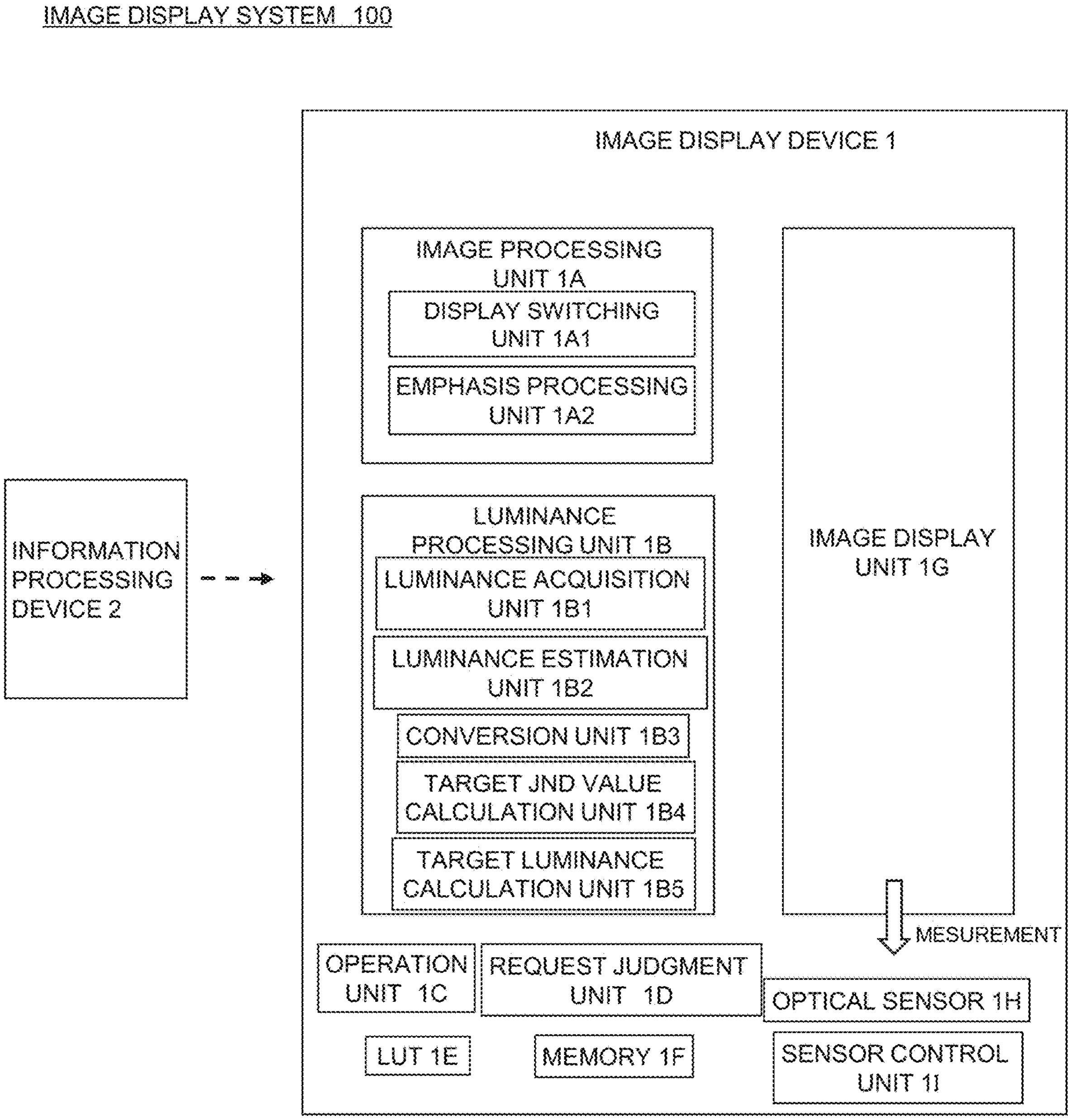
FIG. 1 is a functional block diagram of an image display system 100 including an image display device 1 according to an embodiment.

This section describes the overall configuration of an image display system 100, including an image display device 1 according to the embodiment. The image display system 100 of this embodiment has the image display device 1 and an information processing device 2, as shown in FIG. 1. The image display device 1 includes an image processing unit 1A, a luminance processing unit 1B, an operation unit 1C, a request judgment unit 1D, a LUT (Look Up Table) 1E, a memory 1F, an image display unit 1G, an optical sensor 1H, and a sensor control unit H. The image processing unit 1A, the luminance processing unit 1B, and the request judgment unit 1D read programs stored in the memory 1F and execute various arithmetic operations, and are composed of a CPU, etc. for example.

Each of the above components may be realized by software or by hardware. When realized by software, various functions can be realized by the CPU executing the computer program. The program may be stored in built-in memory or a computer-readable non-transitory storage medium. Further, the program stored in the external the memory may be read and realized by so-called cloud computing. When realized by hardware, it can be realized by various circuits such as ASIC, FPGA, or DRP. The present embodiment deals with various information and concepts encompassing the same, which are represented by high and low signal values as a collection of binary bits consisting of 0 or 1, and communication and arithmetic operations can be performed by the above software or hardware manner.

The image display device 1 acquires image data from the information processing device 2 and outputs processed image data to the image display unit 1G. The information processing device 2 controls the image display device 1. In addition, the information processing device 2 outputs image data of images to be displayed on the image display unit 1G to the image display device 1. The optical sensor 1H is configured to measure a luminance of the image display unit 1G. The optical sensor 1H is described as being mounted on the image display device 1, but it is not limited to this form.

3. DETAILED CONFIGURATION OF IMAGE DISPLAY DEVICE 1

When a physician reads a medical image displayed on the image display unit 1G, the physician sometimes increases the luminance of the image display unit 1G. Therefore, the image display device 1 in the embodiment is configured to be able to execute a luminance increase mode to increase the luminance of the image display unit 1G. The luminance increase mode in the embodiment is a mode in which a luminance setting value is set to the maximum value, and is useful for detecting, for example, lesions.

Here, it is necessary to acquire the luminance of the image display unit 1G in order to display an image on the image display unit 1G corresponding to the GSDF, which is a predetermined gradation characteristic. As a method of acquiring this luminance, a method that uses a calculated value based on an operating current value (backlight current value or PWM value) of the image display unit 1G can be considered. However, there is a concern that the calculated value deviates from the actual luminance (display luminance) of the image display unit 1G due to age-related deterioration of the image display unit 1G, etc. Specifically, the backlight that constitutes the image display unit 1G deteriorates, and the luminance when a predetermined amount of current is applied to the deteriorated backlight becomes smaller than the luminance when the same amount of current is applied to the backlight before the deterioration. In other words, a luminous efficiency of the backlight decreases due to degradation of the backlight constituting the image display unit 1G. Therefore, from the viewpoint of displaying on the image display unit 1G with the GSDF characteristic more in accordance with the actual display light, it is preferable to use the display luminance acquired by measuring the display light of the image display unit 1G instead of using the operating current value (backlight current value or PWM value) described above. On the other hand, because it takes time for the display luminance of the image display unit 1G to stabilize after the luminance setting value is changed, the image display device 1 takes time to acquire stabilized display luminance.

Therefore, when the image display system 1 in the embodiment accepts a request to execute a luminance increase mode (when the luminance setting value is changed), the image display system 1 has a function to display an image of the first gradation characteristic and then replace the image with an image of the second gradation characteristic. In other words, the luminance increase mode is a mode in which an image is displayed with the first gradation characteristic and then an image is displayed with the second gradation characteristic.

Here, the first gradation characteristic is able to be acquired more quickly than the second gradation characteristic. In the first gradation characteristic, a gradation value is associated with a first target luminance described below, and the first target luminance is able to be acquired by using the calculated values described above.

On the other hand, the second gradation characteristic is a gradation characteristic that more accurately reflects the actual luminance (display luminance). In the second gradation characteristic, a gradation value is associated with a second target luminance described below, and the second target luminance is able to be acquired by using the display luminance acquired by measuring the display light.

3-1. Image Processing Unit 1A

Image processing unit 1A is configured to perform image processing based on the data stored in the LUT 1E and display image-processed data on the image display unit 1G. As shown in FIG. 1, the image processing unit 1A has a display switching unit 1A1 and an emphasis processing unit 1A2.

(Display Switching Unit 1A1)

The display switching section 1A1 is configured to set a first gradation characteristic as a gradation characteristic of the image data to be displayed on the image display unit 1G to a first gradation characteristic and then switch the first gradation characteristic to a second gradation characteristic. In other words, the display switching unit 1A1 is configured to switch an image to be displayed on the image display unit 1G from an image of the first gradation characteristic to an image of the second gradation characteristic when the image display device 1 (the request judgment unit 1D) accepts a request to change a luminance setting value. The display switching unit 1A1 performs the switching described above when the request judgment unit 1D determines that there is a request to execute the luminance increase mode.

(Emphasis Processing Unit 1A2)

Figure 8A:
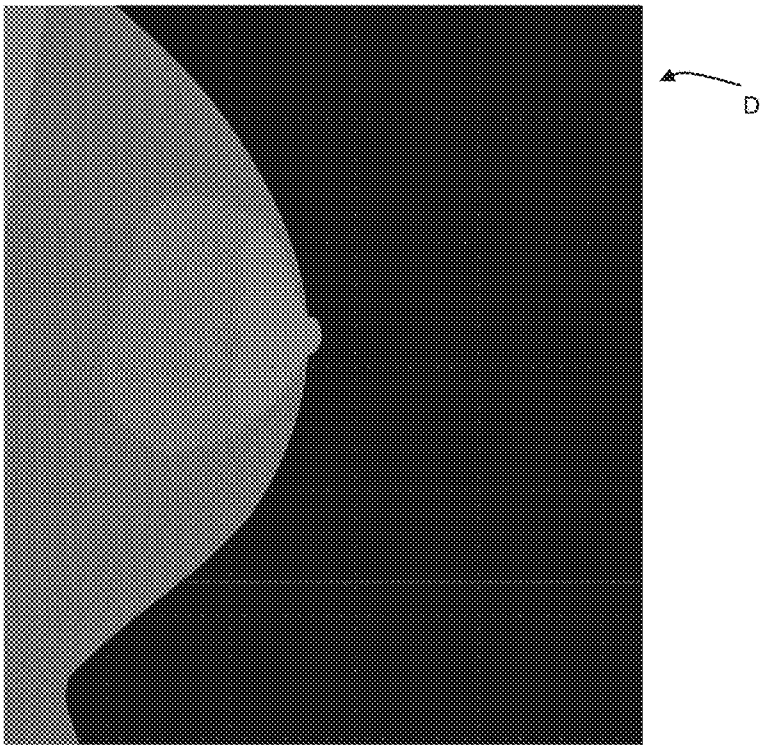
FIG. 8A schematically shows an image displayed on the image display unit when the luminance increase mode is OFF.

The emphasis processing unit 1A2 is configured to emphasis a frame Fr (see FIGS. 8A and 8B) of the image data to be displayed on the image display unit 1G. A physician sometimes forgets about whether or not the physician operated the control unit 1C and is not able to determine whether the luminance increase mode is ON or OFF. The fact that the image display device 1 has the emphasis processing unit 1A2 means that the frame Fr of an image D is not highlighted when the luminance increase mode is OFF, but on the other hand, the frame Fr of the image D is highlighted when the luminance increase mode is ON. This allows the physician to easily judge whether the luminance increase mode is ON or OFF by viewing the frame Fr of image D. In addition, because the frame Fr (outside) of the image D is highlighted instead of inside the image D, it is possible to avoid that an emphasis display of the emphasis processing unit 1A2 interferes with the physician's reading of the image and to prevent misdiagnosis.

3-2 Luminance Processing Unit 1B

Figure 2:
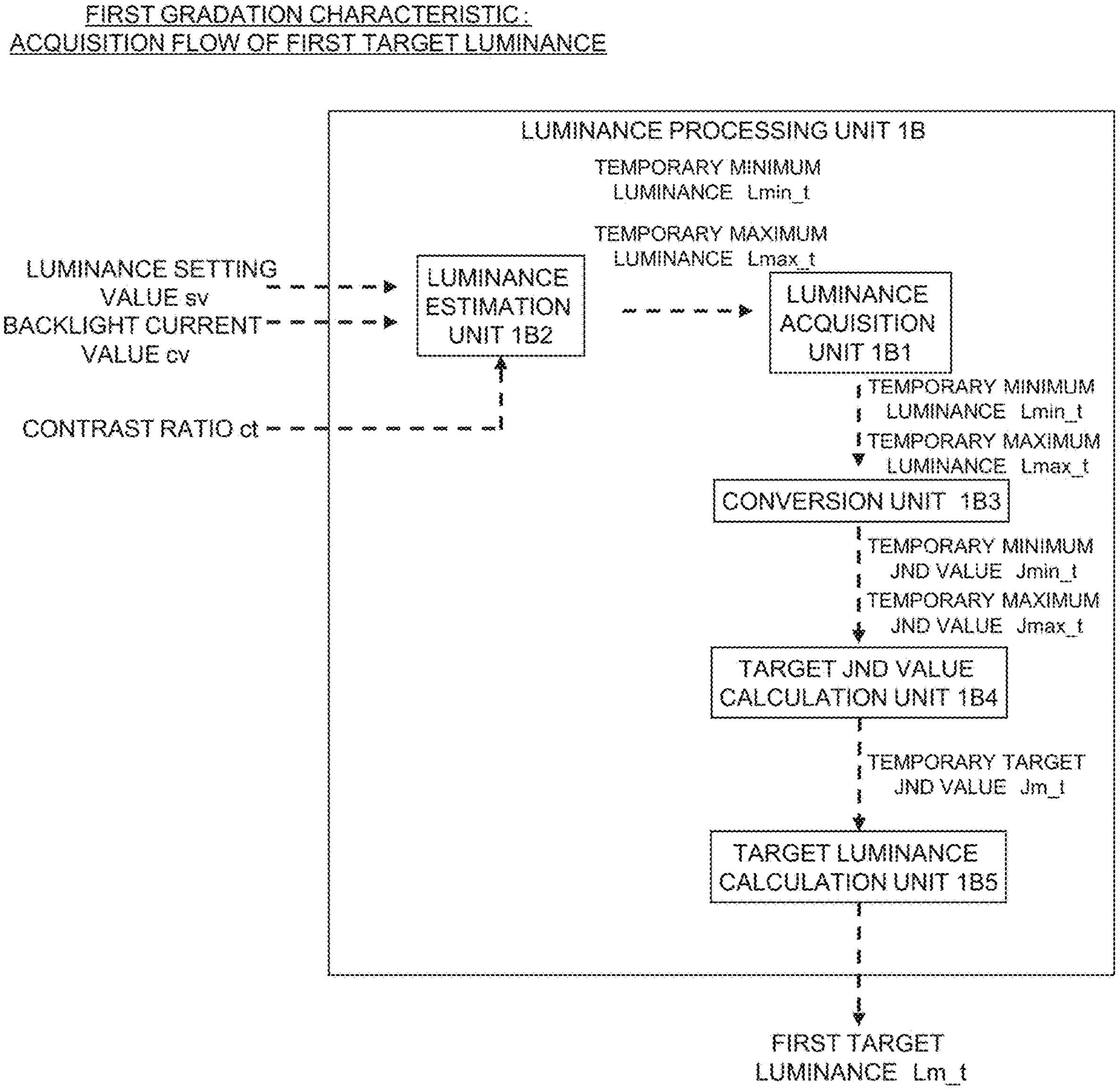
FIG. 2 is an explanatory diagram of an acquisition flow of a first target luminance of a first gradation characteristic.

The luminance processing unit 1B has a function of calculating a target luminance to be stored in a table of LUT 1E. As shown in FIG. 2, the luminance processing unit 1B includes a luminance acquisition unit 1B1, a luminance estimation unit 1B2, a conversion unit 1B3, a target JND value calculation unit 1B4, and a target luminance calculation unit 1B5.

(Luminance Acquisition Unit 1B1)

As shown in FIG. 2, when acquiring the first gradation characteristic, the luminance acquisition unit 1B1 acquires a temporary maximum luminance Lmax_t, which is a calculated value of a maximum luminance, and a temporary minimum luminance Lmin_t, which is a calculated value of a minimum luminance, calculated by the luminance estimation unit 1B2 described below.

Figure 3:
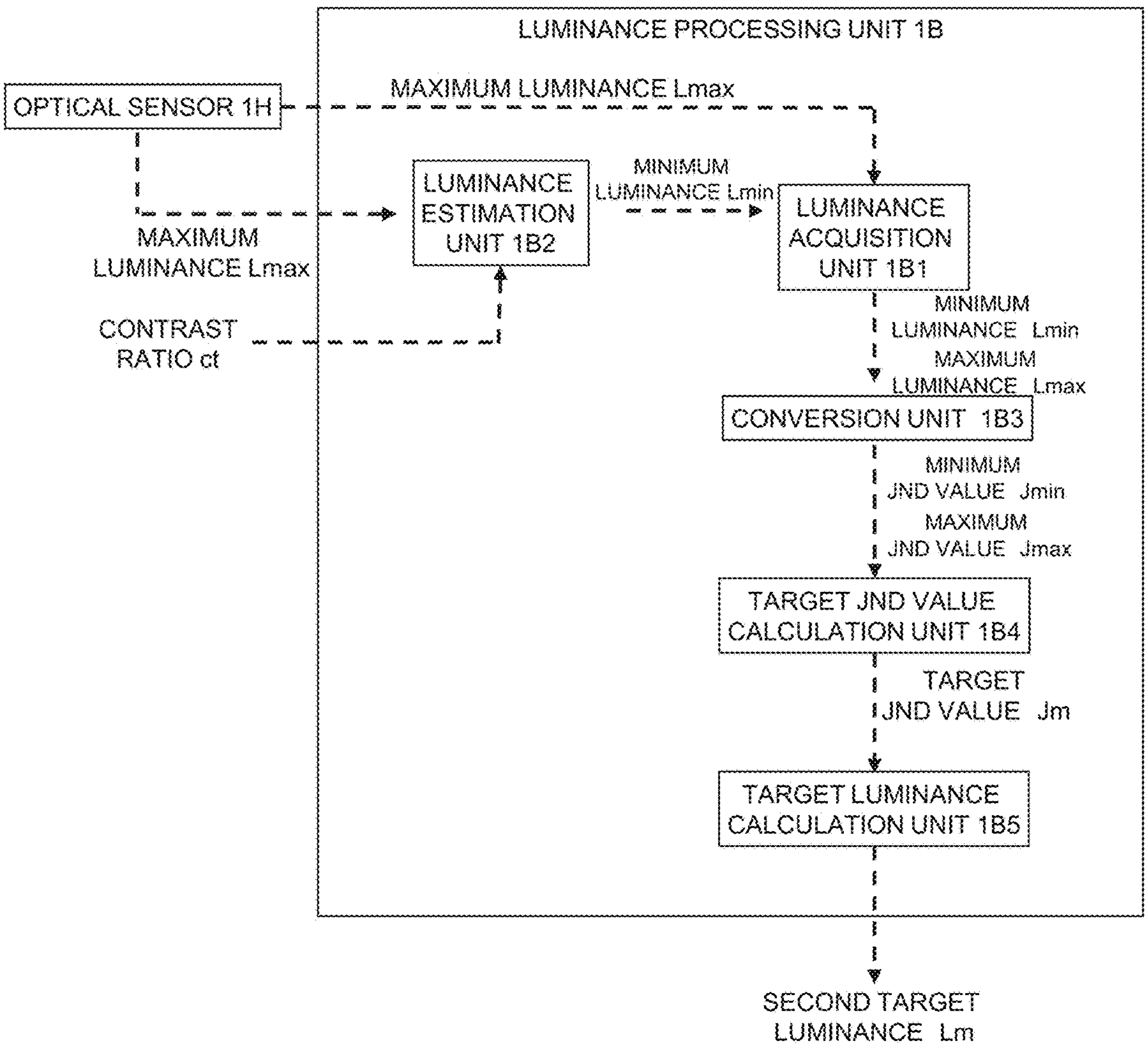
FIG. 3 is an explanatory diagram of an acquisition flow of a second target luminance of a second gradation characteristic.

As shown in FIG. 3, when acquiring the second gradation characteristic, the luminance acquisition section 1B1 acquires a display luminance (maximum luminance Lmax) acquired by the optical sensor 1H and a minimum luminance Lmin calculated by the luminance estimation unit 1B2.

(Luminance Estimation Unit 1B2)

As shown in FIG. 2, when acquiring the first gradation characteristic, the luminance estimation unit 1B2 calculates a temporary maximum luminance Lmax_t, which is a calculated value of a maximum luminance based on the luminance setting value sv (an example of the first luminance setting value) immediately before accepting a request for the image display device 1 and the operating current value cv of the image display unit 1G at the luminance setting value sv. As the operating current value cv, for example, the backlight current value of the image display unit 1G is able to be used if the dimming method of the image display unit 1G is the DC current dimming method, and the PWM value is able to be used if the dimming method of the image display unit 1G is PWM dimming. It is noted that the PWM value is a value corresponding to the pulse width of the PWM signal output to the backlight driver circuit. It is noted that the calculated value of luminance is able to be calculated by using a known method such as, for example, JP-A-2007-11246, etc. The luminance estimation unit 1B2 calculates the temporary minimum luminance Lmin_t based on the calculated temporary maximum luminance Lmax_t and the contrast ratio ct. It is noted that the contrast ratio is the ratio of the maximum luminance to the minimum luminance.

As the contrast ratio ct, a contrast ratio at factory shipment stored in the memory 1F is able to be used. In addition, the luminance estimation unit 1B2 may periodically acquire the maximum and minimum luminances of the image display unit 1G via the optical sensor 1H, and periodically calculate a contrast ratio using the acquired maximum and minimum luminances. Then, the luminance estimation unit 1B2 may store this calculated contrast ratio in the memory 1F and update it accordingly, and the luminance acquisition unit 1B1 may use this updated contrast ratio.

As shown in FIG. 3, when acquiring the second gradation characteristic, the luminance estimation unit 1B2 calculates the minimum luminance Lmin based on the maximum luminance Lmax, which is acquired by measuring the display light of the image display unit 1G, and the contrast ratio ct. The minimum luminance Lmin may be acquired by directly measuring the minimum luminance of the image display unit 1G without calculation. Then, the luminance estimation unit 1B2 outputs the minimum luminance Lmin to the luminance acquisition unit 1B1.

(Conversion Unit 1B3)

Conversion unit 1B3 has a function of converting luminance to JND value based on formula 1 specified in the DICOM shown in FIG. 6A.

As shown in FIG. 2, when acquiring the first gradation characteristic, the conversion unit 1B3 acquires the temporary minimum luminance Lmin_t and the temporary maximum luminance Lmax_t from the luminance acquisition unit 1B1. Then, the conversion unit 1B3 converts the temporary minimum luminance Lmin_t to the temporary minimum JND value Jmin_t and converts the temporary maximum luminance Lmax_t to the temporary maximum JND value Jmax_t.

In addition, when acquiring the second gradation characteristic, as shown in FIG. 3, the conversion unit 1B3 acquires the minimum luminance Lmin and the maximum luminance Lmax from the luminance acquisition unit 1B1. Then, the conversion unit 1B3 converts the minimum luminance Lmin to the minimum JND value Jmin and converts the maximum luminance Lmax to the maximum JND value Jmax.

(Target JND Value Calculation Unit 1B4)

The target JND value calculation unit 1B4 has a function of calculating the target JND value for each gradation based on formula 3 shown in FIG. 6C. In other words, the target JND value calculation unit 1B4 calculates the target JND value for each gradation based on the largest JND value, the smallest JND value, and the predetermined number of gradations. In the embodiment, it is explained that the number of gradations is assumed to be from 0 to 255, but it is not limited to this.

When acquiring the first gradation characteristic, the target JND value calculation unit 1B4 calculates the temporary target JND value Jm_t for each gradation based on the temporary minimum luminance Lmin_t, the temporary maximum luminance Lmax_t, and the number of gradations (255).

When acquiring the second gradation characteristic, the target JND value calculation unit 1B4 calculates the target JND value Jm for each gradation based on the minimum luminance Lmin, the maximum luminance Lmax, and the number of gradations (255).

(Target Luminance Calculation Unit 1B5)

The target luminance calculation unit 1B5 has a function of converting JND value to luminance based on formula 2 specified in the DICOM shown in FIG. 6B.

When acquiring the first gradation characteristic, the target luminance calculation unit 1B5 converts the temporary target JND value Jm_t for each gradation to the first target luminance Lm_t, which is the temporary target luminance for each gradation.

When acquiring the second gradation characteristic, the target luminance calculation unit 1B5 converts the target JND value Jm of each gradation to the second target luminance Lm, which is the target luminance for each gradation.

The first target luminance Lm_t for each gradation calculated by the target luminance calculation unit 1B5 is stored in a table in LUT 1E. The same is true for the second target luminance Lm for each gradation.

3-3. Operation Unit 1C

The operation unit 1C is for operating the image display device 1 and is able to be configured, for example, with buttons, a touch panel, and a voice input device, etc. The operation unit 1C is configured to be able to accept execution of the luminance increase mode. That is, the image display device 1 accepts a request to execute the luminance increase mode via the operation unit 1C. The image display device 1 may also accept a request to execute the luminance increase mode from the information processing device 2 instead of the operation unit 1C.

3-4. Request Judgment Unit 1D

The request judgment unit 1D has a function of judging whether or not the physician has operated the operation unit 1C to turn on the luminance increase mode, i.e., whether or not there is a request to execute the luminance increase mode. The luminance increase mode in the embodiment is a mode in which the luminance setting value (an example of the first luminance setting value) immediately before a request for the luminance increase mode is accepted is changed to the maximum luminance setting value (an example of the second luminance setting value). Therefore, the request judgment unit 1D has a function of judging whether or not there is a request to change the luminance setting value to the maximum luminance setting value from the luminance setting value immediately before accepting a request for the luminance increase mode.

3-5. LUT 1E

LUT1E has LUT data. The LUT data is configured as a table (conversion table) of output data associated with input data. The input data corresponds to image data to be acquired from the information processing device 2, and the image data converted through the LUT 1E is image-processed by the image processing unit 1A and displayed on the image display unit 1G. The first target luminance is stored in the LUT 1E each time the first target luminance is calculated. In other words, each time the image display device 1 accepts a request to execute the luminance increase mode via the operation unit 1C, the first target luminance is calculated by the luminance processing unit 1B and stored in the LUT 1E. As a result, the first target luminance that better matches the current state of the image display unit 1G is stored in the LUT 1E.

The first target luminance may be calculated by the luminance processing unit 1B when a predetermined condition is met, and the calculated first target luminance may be stored in the memory 1F in advance and updated. For example, the predetermined condition may be, for example, a condition that the number of requests accepted is counted and whether or not the count reaches a threshold value, or a condition that whether or not a predetermined time elapses since the first target luminance was calculated. This eliminates the need to calculate the first target luminance for each request, and it is possible to divert the table. In other words, when there is a request for the luminance increase mode, it is possible to promptly display an image reflecting the GSDF characteristic on the image display unit 1G, and to effectively suppress a decrease in the physician's usability.

3-5. Memory 1F

The memory 1F stores various data and programs. For example, various data such as formulas 1 to 3 shown in FIG. 6A to FIG. 6C and the contrast ratio of the image display unit 1G are stored in memory 1F.

3-6. Image Display Unit 1G

The image display unit 1G displays image data (including still and moving images) as images. The image display unit 1G is able to be composed of, for example, a liquid crystal display and an organic EL display, etc.

3-7. Optical Sensor 1H and Sensor Control Unit 1I

The optical sensor 1H and the sensor control unit 1I are built into the image display device 1. The optical sensor 1H is arranged, for example, on the back side of the backlight of the image display unit 1G. The optical sensor 1H is configured to be able to directly measure a luminance of the backlight and operates under the control of the sensor control unit H.

4. FLOWCHART

Figure 4:
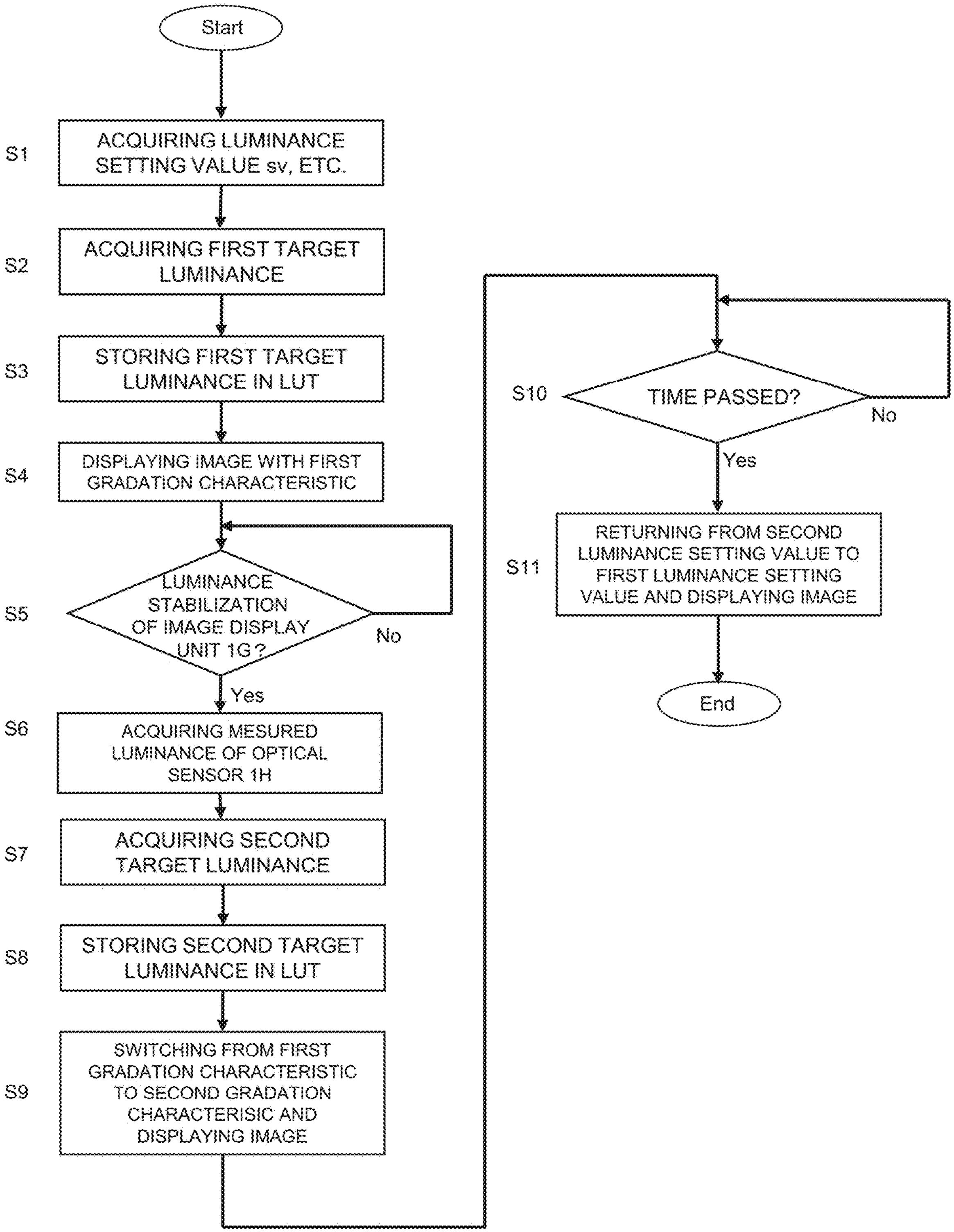
FIG. 4 is a control flowchart of an image display system 100 including the image display device 1 according to the embodiment.

An example of a control flowchart of the image display system 100 is described based on FIG. 4. When the request judgment unit 1D judges that the operation to turn ON the luminance increase mode was performed, in other words, when the request judgment unit 1D accepts a request to change the luminance setting value, the control flowchart shown in FIG. 4 starts.

(Step S1: Setting Value Acquisition)

The luminance estimation unit 1B2 acquires the luminance setting value sv, the operating current value cv, and the contrast ratio ct.

(Step S2: Calculating First Target Luminance)

The luminance estimation unit 1B2 calculates the temporary maximum luminance Lmax_t based on the luminance setting value sv and the operating current value cv. The luminance estimation unit 1B2 also calculates the temporary minimum luminance Lmin_t based on the temporary maximum luminance Lmax_t and the contrast ratio ct. The conversion unit 1B3 converts the temporary minimum luminance Lmin_t to the temporary minimum JND value Jmin_t and also converts the temporary maximum luminance Lmax_t to the temporary maximum JND value Jmax_t. The Target JND value calculation unit 1B4 calculates a temporary target JND value Jm_t for each gradation based on the temporary minimum luminance Lmin_t and the temporary maximum luminance Lmax_t. The target luminance calculation unit 1B5 converts the temporary target JND value Jm_t for each gradation to the first target luminance Lm_t, which is the temporary target luminance for each gradation.

(Step S3: Storing First Target Luminance)

The luminance processing unit 1B stores the acquired first target luminance Lm_t for each gradation in the table of LUT 1E.

(Step S4: Displaying First Image)

Figure 8B:
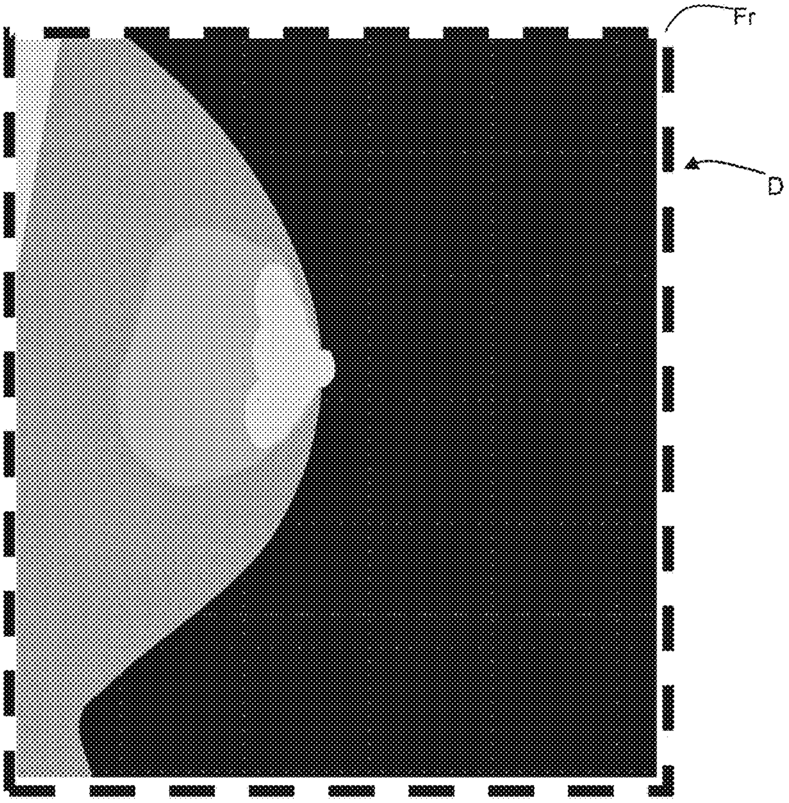

The image processing unit 1A causes the image display unit 1G to display the image data input from the information processing device 2 using the table in LUT 1E that stores the first target luminance Lm_t. This causes the image display unit 1G to switch from displaying the image D1 with relatively low luminance, as shown in FIG. 7, to displaying the image D2 with relatively high luminance, as shown in FIG. 7. In addition, as shown in FIG. 8*b*, the emphasis processing unit 1A2 highlights the frame Fr of the image data to be displayed on the image display unit 1G.

(Step S5: Stabilizing)

The luminance estimation unit 1B2 judges whether the display luminance of the image display unit 1G, which is output from the optical sensor 1H, was stabilized. Since it takes time for the display luminance to stabilize after the luminance setting value is maximized, the image display device 1 judges whether the display luminance was stabilized in order to acquire a more accurate display luminance. For this judgment, for example, conditions such as whether the luminance value output from the optical sensor 1H is below a predetermined threshold value or within a predetermined range are able to be used. In addition, instead of using the luminance value from the optical sensor 1H, the condition of whether a predetermined time elapsed since the request judgment unit 1D accepted the request to change the luminance setting value is able to be used for this judgment.

(Step S6: Acquiring Luminance)

The luminance estimation unit 1B2 acquires the display luminance of the image display unit 1G, which is output from the optical sensor 1H. In the embodiment, since the luminance setting value of the image display unit 1G is changed to the maximum value, the luminance estimation unit 1B2 acquires the maximum luminance Lmax.

(Step S7: Calculating Second Target Luminance)

The luminance estimation unit 1B2 calculates the minimum luminance Lmin based on the maximum luminance Lmax and the contrast ratio ct. The conversion unit 1B3 converts the minimum luminance Lmin to the minimum JND value Jmin and converts the maximum luminance Lmax to the maximum JND value Jmax. The target JND value calculation section 1B4 calculates the target JND value Jm for each gradation based on the minimum luminance Lmin and maximum luminance Lmax. The target luminance calculation unit 1B5 converts the target JND value Jm for each gradation to the second target luminance Lm for each gradation.

(Step S8: Storing Second Target Luminance)

The luminance processing unit 1B stores the acquired second target luminance Lm for each gradation in the table of the LUT 1E.

(Step S9: Displaying Second Image)

The display switching unit 1A1 of the image processing unit 1A displays the image data input from the information processing device 2 on the image display unit 1G using the table in the LUT 1E that stores the second target luminance Lm. In other words, the display switching unit 1A1 of the image processing unit 1A switches the gradation characteristic of the image to be displayed on the image display unit 1G from the first gradation characteristic to the second gradation characteristic. As a result, the image display unit 1G switches from displaying image D2, as shown in FIG. 7, to displaying image D3 with the GSDF characteristic more in line with the actual display light, as shown in FIG. 7. In addition, the emphasis processing unit 1A2 highlights the frame Fr of the image data to be displayed on the image display unit 1G. The step of displaying second image is an example of step of processing image.

(Step S10: Timing)

The image processing unit 1A judges whether or not a predetermined time (e.g., one minute) elapsed since the request judgment unit 1D accepted the request to change the luminance setting value. The luminance increase mode in the embodiment places a large load on the image display unit 1G in order to set the luminance setting value to the maximum value. For this reason, the image processing unit 1A performs a timing step and decreases the luminance setting value when a predetermined amount of time elapsed. This allows the image display device 1 to suppress the degradation of the image display unit 1G.

(Step S11: Lowering Setting Luminance)

The display switching unit 1A1 lowers the luminance setting value of the image display unit 1G. Specifically, the display switching unit 1A1 causes the image display unit 1G to display the image using the table where the target luminance for each gradation is lower than the second target luminance in the LUT 1E. In the embodiment, the display switching unit 1A1 causes the image display unit 1G to display the image using the table of the luminance setting value (an example of the first luminance setting value) immediately before a request for the luminance increase mode is accepted. In other words, the display switching unit 1A1 returns the luminance setting value of the image display unit 1G from the maximum luminance setting value (an example of the second luminance setting value) to the luminance setting value (an example of the first luminance setting value) immediately before accepting the request for the luminance increase mode.

5. EFFECT OF EMBODIMENT

When the image display system 100 according to the embodiment accepts a request to change the luminance setting value, the image display system 100 sets the gradation characteristic of the image data to be displayed on the image display unit 1G to the first gradation characteristics, at the same time, and switches the luminance setting value from the luminance setting value (an example of the first luminance setting value) immediately before accepting the request for the luminance increase mode to the maximum luminance setting value (an example of the second luminance setting value). Thereafter, the image display system 100 of the embodiment is configured to switch the gradation characteristic from the first gradation characteristic to the second gradation characteristic.

Here, the first gradation characteristic is able to be acquired even without the measurement result of the optical sensor 1H. In other words, since increasing the display luminance of the image display unit 1G is not required to acquire the first gradation characteristic, the acquisition of the first gradation characteristic is able to be performed in parallel with the operation of increasing the display luminance of the image display unit 1G and the measurement operation of the display luminance of the image display unit 1G. Although the first gradation characteristic is not images that reflect the measurement result (display luminance) of the actual display light, the first gradation characteristic is still suitable for image reading because the first gradation characteristic corresponds to the GSDF.

Because the conventional image display system is configured not to display an image with the first gradation characteristic as in the embodiment, there is a large time lag between accepting a request to change the luminance setting value and displaying an image in line with the GSDF, and the usability is impaired.

In other words, the conventional image display system, upon accepting a request to change the luminance setting value, requires the following operations: (1) change the luminance setting value, (2) measure the display luminance after the luminance setting value is changed, (3) acquire the target luminance of each gradation value based on the measured display luminance, and (4) switch the gradation value. Therefore, a time lag occurs from the time the user changes the luminance of the image display until the image corresponding to the desired gradation characteristic is displayed on the image display. During this time lag period, because the image based on the gradation characteristic before the luminance change is displayed at the display luminance after the luminance change, the gradation characteristic of the displayed image deviates from the desired gradation characteristic, thereby spoiling the usability of the image display system.

In contrast, the image display system 100 of the embodiment is configured to promptly display an image (an image of the first gradation characteristic) close to the image of the second gradation characteristic after accepting a request to change the luminance setting value.

Here, the first gradation characteristic associates the target luminance (i.e., the first target luminance) estimated using the second luminance setting value with the gradation value. On the other hand, the second gradation characteristic associates the target luminance (i.e., the second target luminance) acquired based on the display luminance of the second luminance setting value actually acquired by the luminance acquisition unit 1B1 with the gradation value. Therefore, the first gradation characteristic and the second gradation characteristic are approximate. This allows the user to view image data corresponding to the first gradation characteristic, which is more approximate to the second gradation characteristic than the gradation characteristic before the request is accepted, until after the request is accepted but before the image data corresponding to the second gradation characteristic is displayed on the image display unit 1G.

Thus, the image display system 100 of the embodiment is configured to promptly display image data corresponding to the first gradation characteristic that approximates the second gradation characteristic, resulting in good response and enhanced usability.

In many cases, the discrepancy between the first and second gradation characteristics is not so large. In addition, when an image is displayed at maximum luminance, it is difficult for humans to recognize the luminance discrepancy because of the high luminance setting. Therefore, it is difficult for the physician to recognize the change from the image of the first gradation characteristic to the image of the second gradation characteristic. In other words, the image display system 100 of the embodiment has a configuration with good response as described above, but it is difficult for the physician to recognize that the gradation characteristic changed from the first gradation characteristic to the second gradation characteristic, making it easier for the physician to concentrate on the image reading work and enhancing usability.

The configuration of this embodiment is effective in image reading a medical image such as a mammography image, for example, as follows.

A physician image reading a medical image such as a mammography image sometimes increases the luminance of the image display unit to make it easier to detect a lesion. However, if the luminance of the image display is constantly increased, the image display unit deteriorates, making it difficult to guarantee the luminance of the image display unit. To deal with this problem, a configuration in which the luminance is temporarily increased when the image display device 1 accepts a request to make it easier for the physician to read the image, while at the same time making it easier to guarantee the luminance.

On the other hand, it is generally desirable for a medical image such as a mammography image to reflect the GSDF characteristic. Here, when displaying this medical image with the GSDF characteristic, it is necessary to acquire a measured value of the display luminance of the image display unit, and in addition, it is necessary to calculate the target luminance value in line with the GSDF after acquiring the measured value. However, if the luminance of the image display unit 1G is increased, it is not possible to acquire accurate measurement of the display luminance of the image display unit before the luminance of the image display unit stabilizes. In addition, it takes some time to calculate the target luminance value in line with the GSDF.

Therefore, when the image display device adopts a configuration in which the luminance is temporarily increased, a time lag (e.g., about 1 second) occurs after the luminance of the image display unit is increased until an image in line with the GSDF is displayed on the image display unit, because it takes time to acquire a measured value and calculate a target luminance value. As a result, when the physician increases the luminance of the image display unit, the image with increased luminance but not in line with the GSDF is displayed on the image display unit (first stage display), and after the aforementioned time lag, the image with increased luminance in line with the GSDF is displayed (second stage display). As a result, the conventional configuration has a large image change when switching from the image in the first stage display to the image in the second stage display, which may cause discomfort to the physician and impair the usability of the physician.

Therefore, when the image display system 100 according to the embodiment accepts a request to change the luminance setting value, the image display system 100 sets the gradation characteristic to the first gradation characteristic that is in line with the GSDF and then switch to the second gradation characteristic that is in accordance with the GSDF. In other words, since the images displayed before and after the change in the gradation characteristic of the image are both in line with the GSDF, it is difficult for the physician to recognize the change in the image. As a result, the image display system 100 according to the embodiment is able to suppress discomfort to a physician reading a medical image such as a mammography image and enhance the usability of the physician.

6. MODIFICATION 6-1 Function Block of Luminance Processing Unit 1B

Figure 9:
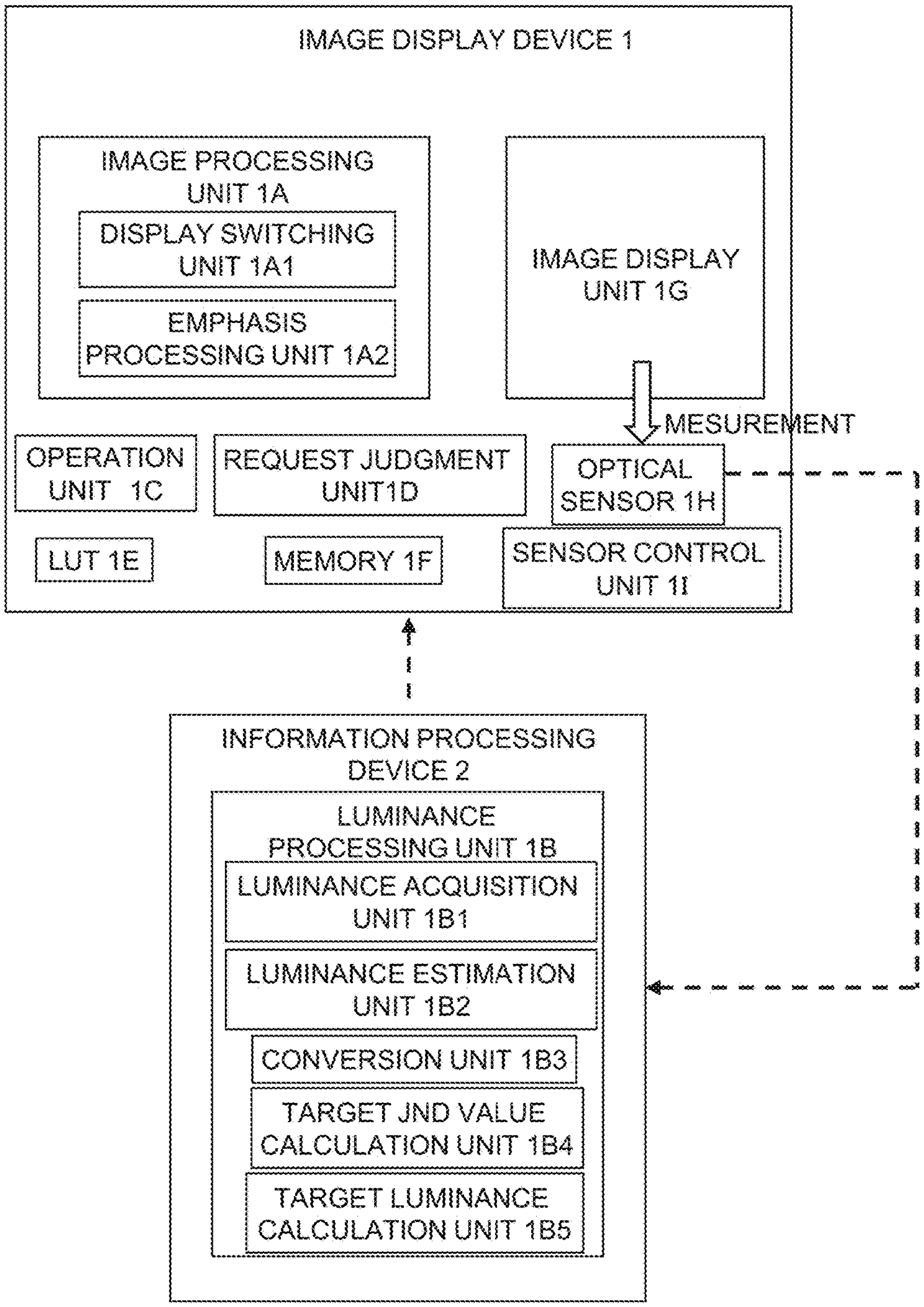
FIG. 9 is a functional block diagram of a modification of the image display system 100.

As shown in FIG. 9, in the image display system 100, the luminance processing unit 1B may be provided in the information processing device 2. Although not shown in the figure, the functional blocks of the luminance processing unit 1B may be provided separately in the image display device 1 and the information processing device 2. For example, the information processing device 2 may include the luminance estimation unit 1B2, and the image display device 1 may include the luminance acquisition unit 1B1, the conversion unit 1B3, the target JND value calculation unit 1B4, and the target luminance calculation unit 1B5.

6-2 Displaying Color Image

The image display device 1 of the embodiment may be an image display device capable of displaying a color image. For example, the image display device 1 only needs to be capable of displaying images in the first and second gradation characteristics when displaying images for medical use in the GSDF.

6-3 Set Luminance Value in Luminance Increase Mode

In the embodiment, although the case where the luminance setting value of the image display device 1 becomes the maximum value when the luminance increase mode is turned ON is described as an example, it is not limited to this. The luminance setting value of the image display device 1 may be a value other than the maximum value.

Furthermore, in the embodiment, the image display device 1 is described as a configuration of increasing the luminance when a request is accepted, but it is not limited to this, and the image display device 1 may also be configured to decrease the luminance 6-4 Using Function In the embodiment, it is described as if the image is displayed on the image display unit 1G using the table in the LUT 1E, but it is not limited to this, and the image may be displayed using a function corresponding to the table.

6-5 Calculation Method of Temporary Maximum Luminance Lmax_T

In the embodiment, the luminance estimation unit 1B2 is described as calculating the temporary maximum luminance Lmax_t, which is a calculated value of the maximum luminance, based on the luminance setting value sv (an example of the first luminance setting value) immediately before accepting a request for the image display device 1 and the operating current value cv of the image display unit 1G at the luminance setting value sv, when acquiring the first gradation characteristic, but it is not limited to this. Instead of the luminance setting value sv immediately before accepting a request for the image display device 1, the luminance estimation unit 1B2 may, for example, use the maximum luminance setting value at the time of factory shipment. In this case, the maximum luminance setting value at the time of factory shipment may be stored in the memory 1E.

6-6 Form of Optical Sensor

In the embodiment, the optical sensor 1H is described as being built into the image display device 1, but it is not limited to this. The optical sensor 1H may be arranged on the front side of the image display unit 1G of the image display device 1 and configured to measure light from the image display surface of the image display unit 1G. In this case, in calculating the second target luminance, the luminance acquisition unit 1B1 may be configured as follows.

The luminance acquisition section 1B1 may calculate the maximum luminance Lmax shown in FIG. 3 by taking the gradation value into account. In other words, the luminance acquisition unit 1B1 may calculate the maximum luminance Lmax based on the output value of the optical sensor 1H and the gradation value. The same is true even if the image display unit 1G is, for example, a liquid crystal display or an organic EL display.

REFERENCE SIGNS LIST

1: image display device
1A: image processing unit
1A1: display switching unit
1A2: emphasis processing unit
1B: luminance processing unit
1B1: luminance acquisition unit
1B2: luminance estimation unit
1B3: conversion unit
1B4: target JND value calculation unit
1B5: target luminance calculation unit
1C: operation unit
1D: request judgment unit
1E: LUT
1F: memory
1G: image display unit
1H: optical sensor
2: information processing device
100: image display system
D: image
D1: image
D2: image
D3: image
Fr: frame
Jm: target JND value
Jm_t: temporary target JND value Jmax: maximum JND value
Jmax_t: temporary maximum JND value
Jmin minimum JND value
Jmin_t: temporary minimum JND value
Lm: second target luminance
Lm_t: first target luminance
Lmax: maximum luminance
Lmax_t: temporary maximum luminance
Lmin minimum luminance
Lmin_t: temporary minimum luminance
ct: contrast ratio
cv: operating current value
sv: luminance setting value

The invention claimed is:

1. An image display system configured to display image data, comprising:

an image display unit;
a luminance acquisition unit; and
an image processing unit, wherein
the image display unit is configured to display the image data,
the luminance acquisition unit is configured to acquire a display luminance of the image display unit,
the image processing unit is configured to set a gradation characteristic of the image data to be displayed on the image display unit to a first gradation characteristic and simultaneously switch a luminance setting value from a first luminance setting value to a second luminance setting value when the image display system accepts a request to change the luminance setting value of the image display unit from the first luminance setting value to the second luminance setting value, and then switch the gradation characteristic of the image data to be displayed on the image display unit to a second gradation characteristic,
the first gradation characteristic associates a gradation value with a first target luminance,
the first target luminance is acquired based on the display luminance in a state of displaying the image data at the first luminance setting value before the image display system accepts the request, and the first target luminance is a target luminance estimated to display the image data at the display luminance in a state where the image display unit sets the second luminance setting value as the luminance setting value,
the second gradation characteristic associates the gradation value with a second target luminance, and
the second target luminance is acquired based on the display luminance in a state of displaying the image data of the first gradation characteristic with the second luminance setting value.

2. The image display system of claim 1, wherein the first target luminance is based on the first luminance setting value before the image display system accepts the request and an operating current value of the image display unit corresponding to the first luminance setting value.

3. The image display system of claim 1, wherein the first gradation characteristic and the second gradation characteristic are composed of a function or a table.

4. The image display system of claim 1, wherein the second luminance setting value is greater than the first luminance setting value.

5. The image display system of claim 4, wherein the second luminance setting value is a maximum value that can be set in the image display unit.

6. The image display system of claim 1, wherein the image processing unit returns the luminance setting value of the image display unit from the second luminance setting value to the first luminance setting value when a predetermined time passes after the image display system accepts the request.

7. The image display system of claim 1, wherein the image processing unit is configured to emphasize a frame of the image data displayed on the image display unit when the image display system accepts the request.

8. An image display device configured to display image data, comprising:

an image display unit;
a luminance acquisition unit; and
an image processing unit, wherein
the image display unit is configured to display the image data,
the luminance acquisition unit is configured to acquire a display luminance of the image display unit,
the image processing unit is configured to set a gradation characteristic of the image data to be displayed on the image display unit to a first gradation characteristic and simultaneously switch a luminance setting value from a first luminance setting value to a second luminance setting value when the image display device accepts a request to change the luminance setting value of the image display unit from the first luminance setting value to the second luminance setting value, and then switch the gradation characteristic of the image data to be displayed on the image display unit to a second gradation characteristic,
the first gradation characteristic associates a gradation value with a first target luminance,
the first target luminance is acquired based on the display luminance in a state of displaying the image data at the first luminance setting value before the image display device accepts the request, and the first target luminance is a target luminance estimated to display the image data at the display luminance in a state where the image display unit sets the second luminance setting value as the luminance setting value,
the second gradation characteristic associates the gradation value with a second target luminance, and
the second target luminance is acquired based on the display luminance in a state of displaying the image data of the first gradation characteristic with the second luminance setting value.

9. An image display method for displaying image data on an image display unit, comprising:

a luminance acquisition step; and an image processing step, wherein
in the luminance acquisition step, a display luminance of the image display unit is acquired,
in the image processing step, a gradation characteristic of the image data to be displayed on the image display unit is set to a first gradation characteristic and simultaneously a luminance setting value of the image display unit is switched from a first luminance setting value to a second luminance setting value when a request to change the luminance setting value from the first luminance setting value to the second luminance setting value is accepted, and then the gradation characteristic of the image data to be displayed on the image display unit is switched to a second gradation characteristic,
the first gradation characteristic associates a gradation value with a first target luminance,
the first target luminance is acquired based on the display luminance in a state of displaying the image data at the first luminance setting value before the request is accepted, and the first target luminance is a target luminance estimated to display the image data at the display luminance in a state where the image display unit sets the second luminance setting value as the luminance setting value, the second gradation characteristic associates the gradation value with a second target luminance, and the second target luminance is acquired based on the display luminance in a state of displaying the image data of the first gradation characteristic with the second luminance setting value.

10. A non-transitory computer readable medium that stores a computer program causing a computer to execute an image display method of claim 9.

* * * * *